(12) United States Patent
Wang et al.

(10) Patent No.: US 7,697,603 B1
(45) Date of Patent: Apr. 13, 2010

(54) METHODS AND APPARATUS FOR EQUALIZATION IN HIGH-SPEED BACKPLANE DATA COMMUNICATION

(75) Inventors: Shoujun Wang, Kanta (CA); Tad Kwasniewski, Ottowa (CA); Bill Bereza, Nepean (CA)

(73) Assignee: Altera Corporation, San Jose, CA (US)

( * ) Notice: Subject to any disclaimer, the term of this patent is extended or adjusted under 35 U.S.C. 154(b) by 1577 days.

(21) Appl. No.: 10/967,459

(22) Filed: Oct. 18, 2004

(51) Int. Cl.
*H03H 7/30* (2006.01)

(52) U.S. Cl. .......................... 375/233; 375/229; 333/18; 381/103; 708/323

(58) Field of Classification Search ................. 375/233, 375/229; 333/18, 28; 381/103; 708/323
See application file for complete search history.

(56) References Cited

U.S. PATENT DOCUMENTS

| | | | | |
|---|---|---|---|---|
| 5,490,169 A | * | 2/1996 | Blackwell et al. ........... | 375/232 |
| 6,870,881 B1 | * | 3/2005 | He .............................. | 375/233 |
| 7,426,236 B1 | * | 9/2008 | He .............................. | 375/232 |
| 2004/0076228 A1 | * | 4/2004 | Park et al. .................... | 375/233 |
| 2004/0213586 A1 | * | 10/2004 | Gu et al. ...................... | 398/203 |
| 2005/0134338 A1 | * | 6/2005 | Momtaz ....................... | 327/158 |
| 2005/0135471 A1 | * | 6/2005 | Tonietto et al. .............. | 375/233 |
| 2005/0135475 A1 | * | 6/2005 | Momtaz et al. ............... | 375/240 |
| 2005/0135510 A1 | * | 6/2005 | Momtaz ....................... | 375/340 |

* cited by examiner

*Primary Examiner*—David C Payne
*Assistant Examiner*—Zewdu Kassa
(74) *Attorney, Agent, or Firm*—Ropes & Gray LLP; Jeffrey H. Ingerman

(57) ABSTRACT

Equalization circuitry that includes an analog equalizer and a decision feedback equalizer (DFE) is provided for high-speed backplane data communication. The analog equalizer reduces the number of taps that are required by the DFE, which lessens the error propagation of the DFE. Furthermore, the DFE includes a summing circuit and flip-flop circuitry. The flip-flop circuitry may be used as part of a phase detector by clock and data recovery circuitry. The summing circuit may further be embedded into the flip-flop circuitry to reduce the feedback path delay, thereby allowing for higher speed operation. The DFE may be extended to multiple taps by including additional flip-flops.

29 Claims, 9 Drawing Sheets

METHODS AND APPARATUS FOR EQUALIZATION IN HIGH-SPEED BACKPLANE DATA COMMUNICATION

BACKGROUND OF THE INVENTION

The present invention relates generally to equalization circuitry. More specifically, the invention relates to an improved decision feedback equalizer with increased speed, a reduced power and area overhead, and that is suitable for high-speed applications.

Equalization circuitry generally acts on signal transitions by briefly responding to the transition more strongly so as to help compensate for high-frequency signal losses when signals are transmitted along a transmission line. Such circuitry is used to restore transmitted signals that suffer from deterioration due to effects such as skin effect, dielectric loss, reflection and crosstalk. These effects all contribute to intersymbol interference (ISI), which limits the speed and distance over which signals may be transmitted.

One general type of equalization circuitry that is sometimes used is an analog equalizer. Analog equalizers are typically implemented as analog high-pass filters to amplify the high-frequency content in incoming data. Such implementations usually consume relatively little power and are well suited for high-speed operation. However, in amplifying the high-frequency content in the signals, analog equalizers also adversely amplify the high-frequency noise, consequently degrading the signal-to-noise ratio (SNR).

Another common type of equalization circuitry is a decision feedback equalizer (DFE). DFEs use feedback to reduce the ISI in a presently transmitted signal. In particular, DFEs feed back a weighted sum of decisions about the logic state of one or more previously transmitted data bits in order to decide the logic state of a present data bit. One of the advantages of DFEs compared to linear, finite impulse response (FIR) filters is that DFEs do not amplify high-frequency noise since the decisions (which are assumed to be correct) are noise-free. Furthermore, DFEs are typically less sensitive to clock jitter. However, conventional DFEs are implemented as FIR filters using digital signal processing (DSP), and the resulting DFE architectures often require multiple feedback taps (coefficient/delay pairs) to achieve target performance. As a result, these DFEs have a large power and area overhead and are limited to low-speed applications due to their relatively long propagation delays. Moreover, when an incorrect decision about the logic state of a transmitted signal is inadvertently made by the DFE, a burst of errors referred to as error propagation may occur. Error propagation in DFEs becomes less of an issue when the number of taps and/or the tap weights are small.

In addition, typically when the DFE is part of general receiver circuitry, the output of the DFE is passed on to clock data recovery (CDR) circuitry that is used to recover a clock signal from the transmitted data signals. This CDR circuitry is typically designed separate from the circuitry that constitutes the DFE.

Thus, it would be desirable to generally provide equalization circuitry that demonstrates small area and power consumption and that would be suitable for high-speed applications. Specifically, it would be desirable to combine a DFE with CDR circuitry in a way to reduce the die area consumed by the receiver circuitry on a device. It would further be desirable to provide an improved DFE architecture that allows the DFE to operate at higher speeds. It would also be desirable provide a way to reduce the number of taps required by a DFE to provide a certain level of equalization, thereby reducing the amount of error propagation caused by the DFE and making the DFE more effective.

SUMMARY OF THE INVENTION

In accordance with the present invention, equalization circuitry that includes a hybrid analog equalizer that is coupled to a DFE is provided. By using an analog equalizer in combination with a DFE, the amount of equalization that is needed to be performed by the DFE is reduced. As a result, the DFE requires fewer feedback taps, which reduces the amount of error propagation caused by the DFE.

Furthermore, the DFE circuitry of the present invention comprises flip-flop circuitry with embedded feedback-summing circuitry that effectively increases the speed of the DFE while reducing the amount of power and area consumption. A sense-amplifier flip-flop (SAFF) may be used for low-power, low-noise DFE designs. Alternatively, a current-mode logic (CML) master-slave flip-flop may be used to further increase the speed of the DFE. In addition, the DFE flip-flops may be integrated with the phase-detector portion of CDR circuitry to further decrease the power and area consumed by a general receiver circuit. The DFE may be configured as a single- or a multiple-tap FIR filter, and also may be designed for full-rate and half-rate clock architectures.

Further features of the invention, its nature and various advantages will be more apparent from the accompanying drawings and the followed detailed description.

DETAILED DESCRIPTION OF THE PREFERRED EMBODIMENTS

Figure 1:
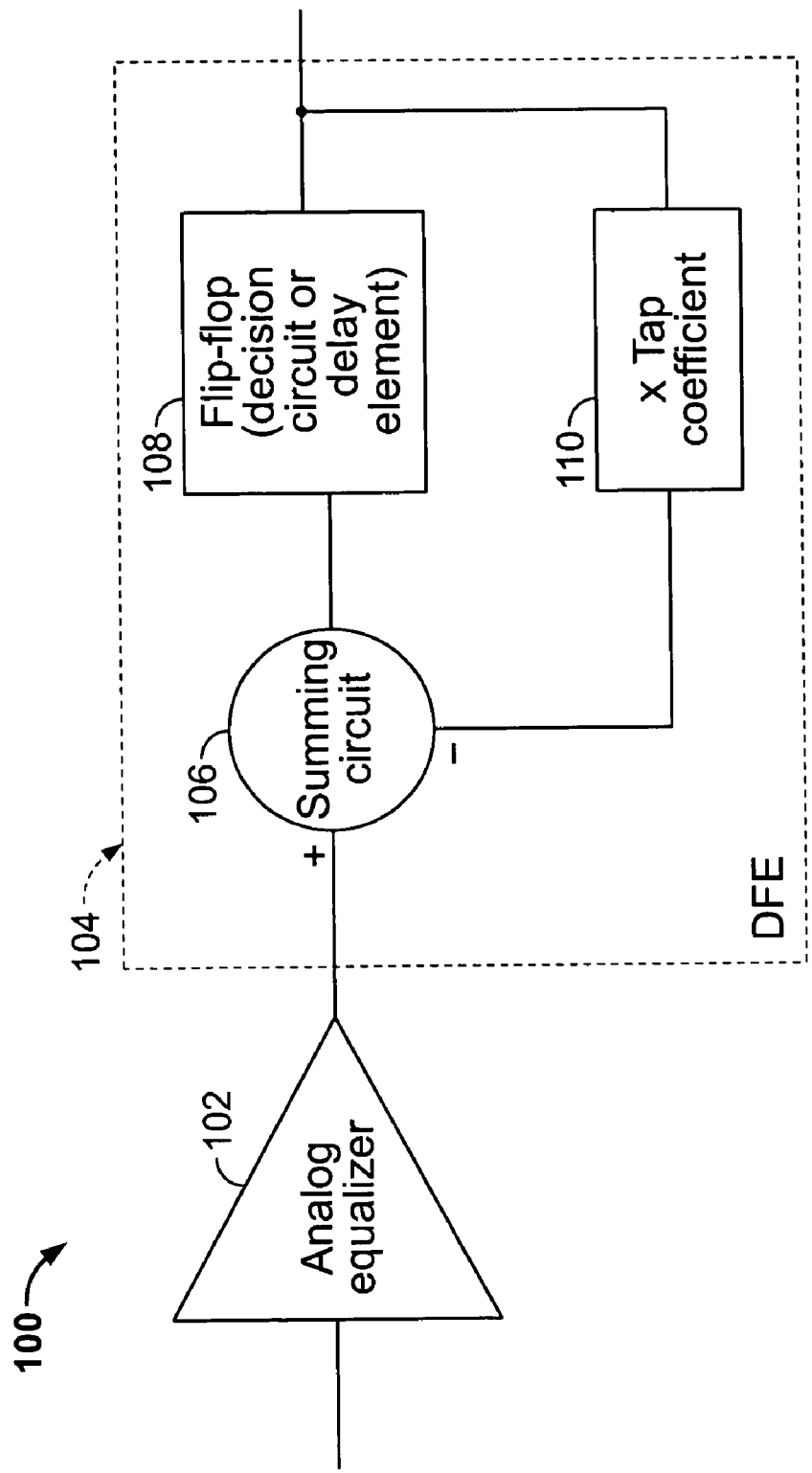
FIG. 1 is a simplified block diagram of an illustrative embodiment of the hybrid equalization circuitry in accordance with the present invention, in which the equalization circuitry includes an analog equalizer and a full-rate, single-tap DFE.

FIG. 1 shows a block diagram of equalization circuitry 100 of the present invention used in a full-rate clock architecture.

(In a full-rate clock architecture, a new bit is provided on every rising edge of the clock signal. This is different from the half-rate clock architecture that will be addressed below, in which a new bit is provided on every rising and falling edge of the clock signal. Separate data paths may be used to receive the data transmitted on these two opposite phases of the clock in a half-rate clock architecture.) Equalization circuitry 100 includes analog equalizer 102 and single-tap DFE 104. Incoming data bits are passed to analog equalizer 102, which equalizes and subsequently outputs the signals to DFE 104. DFE 104 includes feedback-summing circuit (summing circuit) 106, decision circuit or delay element (e.g., flip-flop) 108 and feedback tap coefficient 110. Specifically, a given bit that is transmitted to DFE 104 is delayed using flip-flop 108 and multiplied by tap coefficient 110. The resulting delayed bit is then subtracted from a subsequent bit via summing circuit 106, thus canceling the ISI on the subsequently transmitted bit.

Figure 2:
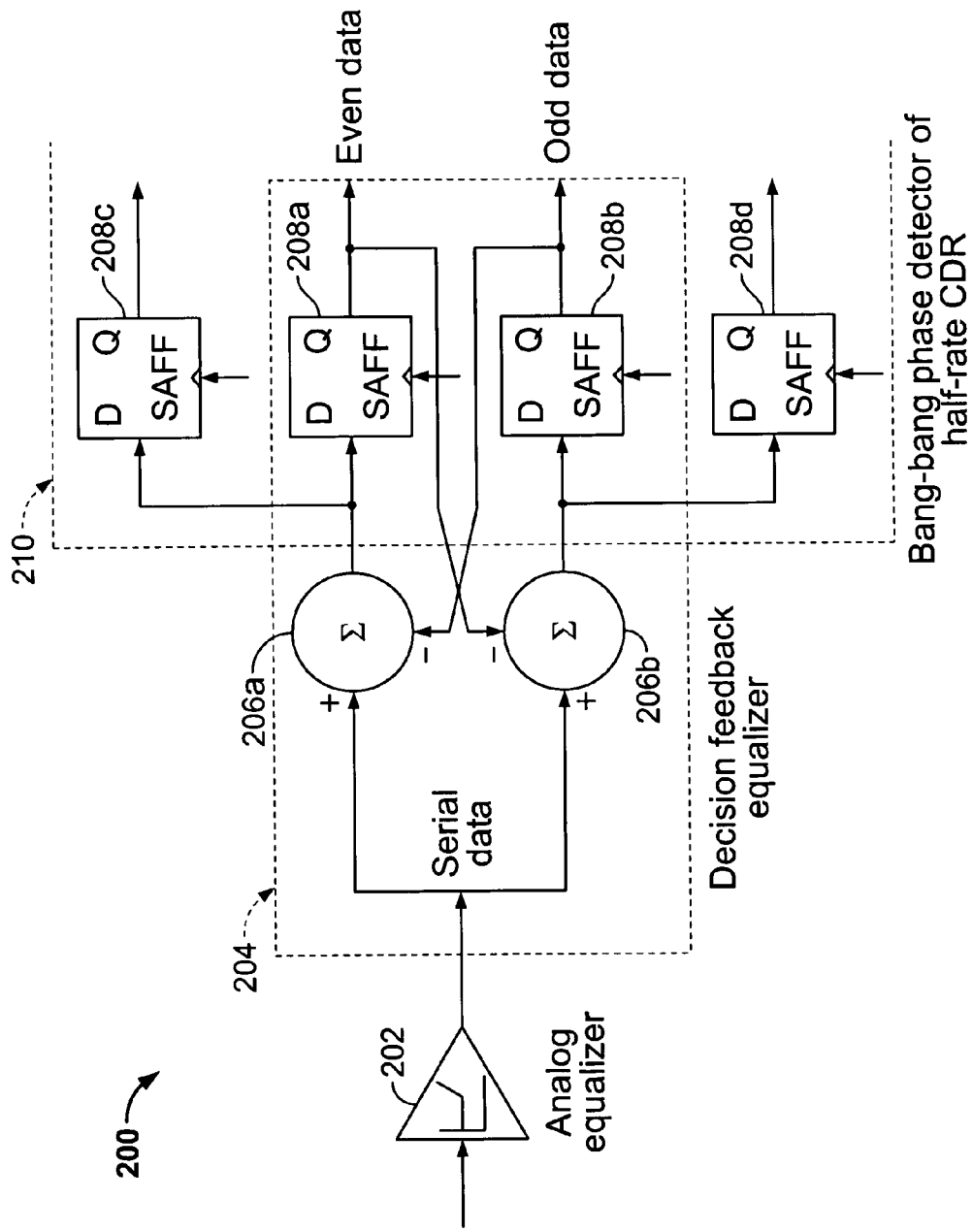
FIG. 2 is a simplified block diagram of an illustrative embodiment of the hybrid equalization circuitry in accordance with the present invention, in which the equalization circuitry includes an analog equalizer and a half-rate, single-tap DFE.

FIG. 2 shows equalization circuitry 200 illustrating another embodiment of the present invention, specifically in which the DFE portion of the equalizer is configured for a half-rate clock architecture. Equalization circuitry 200 includes analog equalizer 202 connected to DFE 204. DFE 204 is made up of an even and an odd data branch. The even data branch of DFE 204 includes summing circuit 206a and SAFF 208a, and the odd data branch of DFE 204 includes summing circuit 206b and SAFF 208b. For the purpose of illustration, it will be assumed that even data bits correspond to the bits that are transmitted on the rising edge of the half-rate clock and that odd data bits correspond to the bits that are transmitted on the falling edge of the half-rate clock (although the reverse situation is also possible). SAFFs 208a and 208b, in combination with SAFFs 208c and 208d, also form part of phase detector 210 that is used by half-rate CDR circuitry (not fully shown). It will be understood that SAFFs 208a-d forming phase detector 210 are clocked by quadrature clocks. Phase detector 210 exhibits high gain and is sometimes referred to as a "bang-bang" phase detector due to its nonlinear transfer function. However, the advantage of a bang-bang phase detector is that it works faster and occupies less area than most other phase detector designs.

The operation of equalization circuitry 200 is similar to the operation of equalization circuitry 100. Incoming data signals are first received by analog equalizer 202. Analog equalizer 202 pre-equalizes the incoming signals and subsequently outputs the data bits to DFE 204. DFE 204 is then configured to cancel the remaining ISI caused by a previous bit that is transmitted immediately prior to a currently transmitted bit. More specifically, as seen in FIG. 2, even-data summing circuit 206a (in the even data branch of DFE 204) is configured to subtract a previously transmitted odd data bit—stored in odd-data SAFF 208b—from a currently transmitted even data bit. Similarly, odd-data summing circuit 206b is configured to subtract output of even-data SAFF 208a, corresponding to a previously transmitted even data bit, from a currently transmitted odd data bit. By subtracting previously transmitted odd data bits from the currently transmitted even data bits and vice-versa, DFE 204 effectively cancels out the ISI in each half-rate data path due to those signal components.

Figure 3:
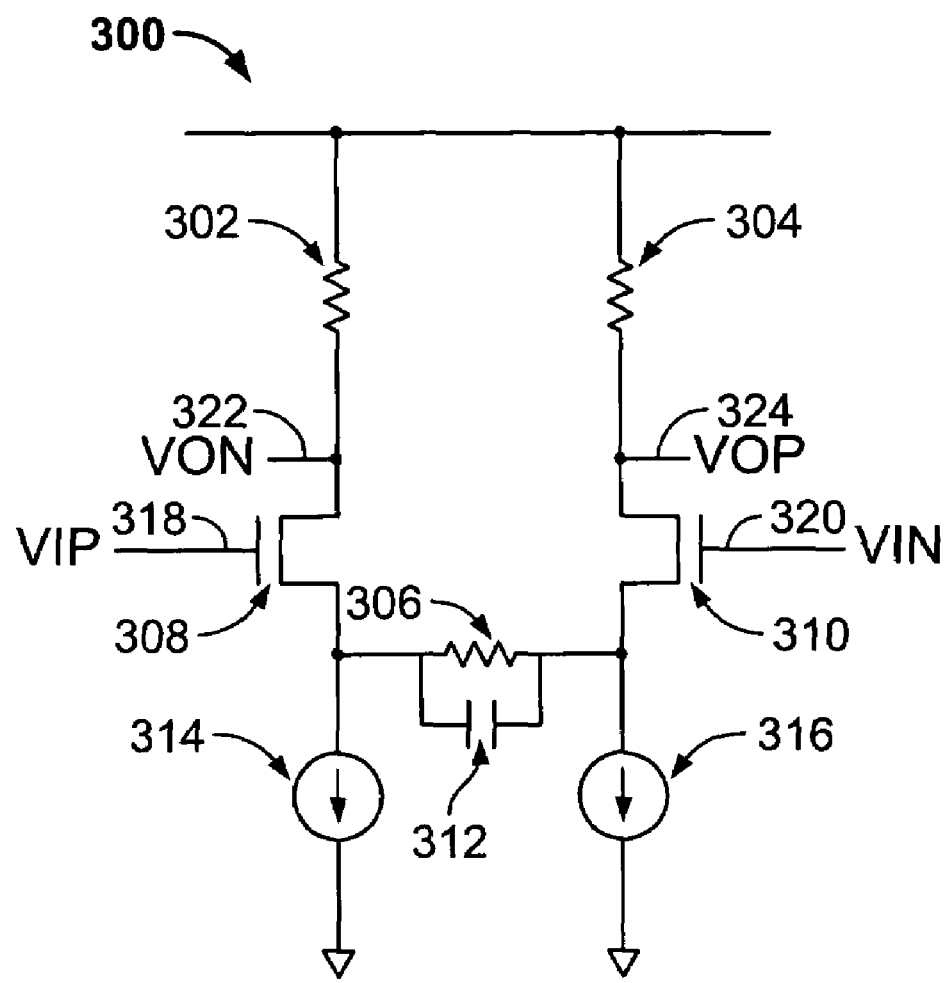
FIG. 3 is a circuit diagram of an illustrative embodiment of the analog equalizer shown in FIG. 1 in accordance with the present invention.

FIG. 3 is a circuit diagram of an illustrative analog equalizer 300 that may be used in accordance with the invention. It will be understood that the circuit diagram of analog equalizer 300 shown in FIG. 2 is based on prior art, and furthermore that other low-power analog equalizers suitable for high-speed operation may be used in place of analog equalizer 300. Typically, analog equalizer 300 is configured as a single-zero, high-pass filter. Analog equalizer 300 includes resistors 302, 304 and 306; NMOS transistors 308 and 310; capacitor 312; and current sinks 314 and 316. In FIG. 3, the positive and negative differential inputs (VIP and VIN) to analog equalizer 300 are tied to gates 318 and 320 of NMOS transistors 308 and 310, respectively, and the positive and negative differential outputs (VIP and VON) are subsequently received on nodes 322 and 324. Capacitor 312 acts as a peaking capacitor that is used to adjust the high-frequency gain peaking (i.e., the amount of gain produced at the resonant frequency of the circuit). Similarly, resistor 306 acts as a source degeneration resistor that is used to adjust the low-frequency gain of the circuit. As the capacitance and resistance of capacitor 312 and resistor 306, respectively, are increased, the amount of gain peaking demonstrated by analog equalizer 302 increases. However, increasing the gain peaking could also introduce excessive group delay distortion due to the circuit bandwidth limitation.

Figure 4:
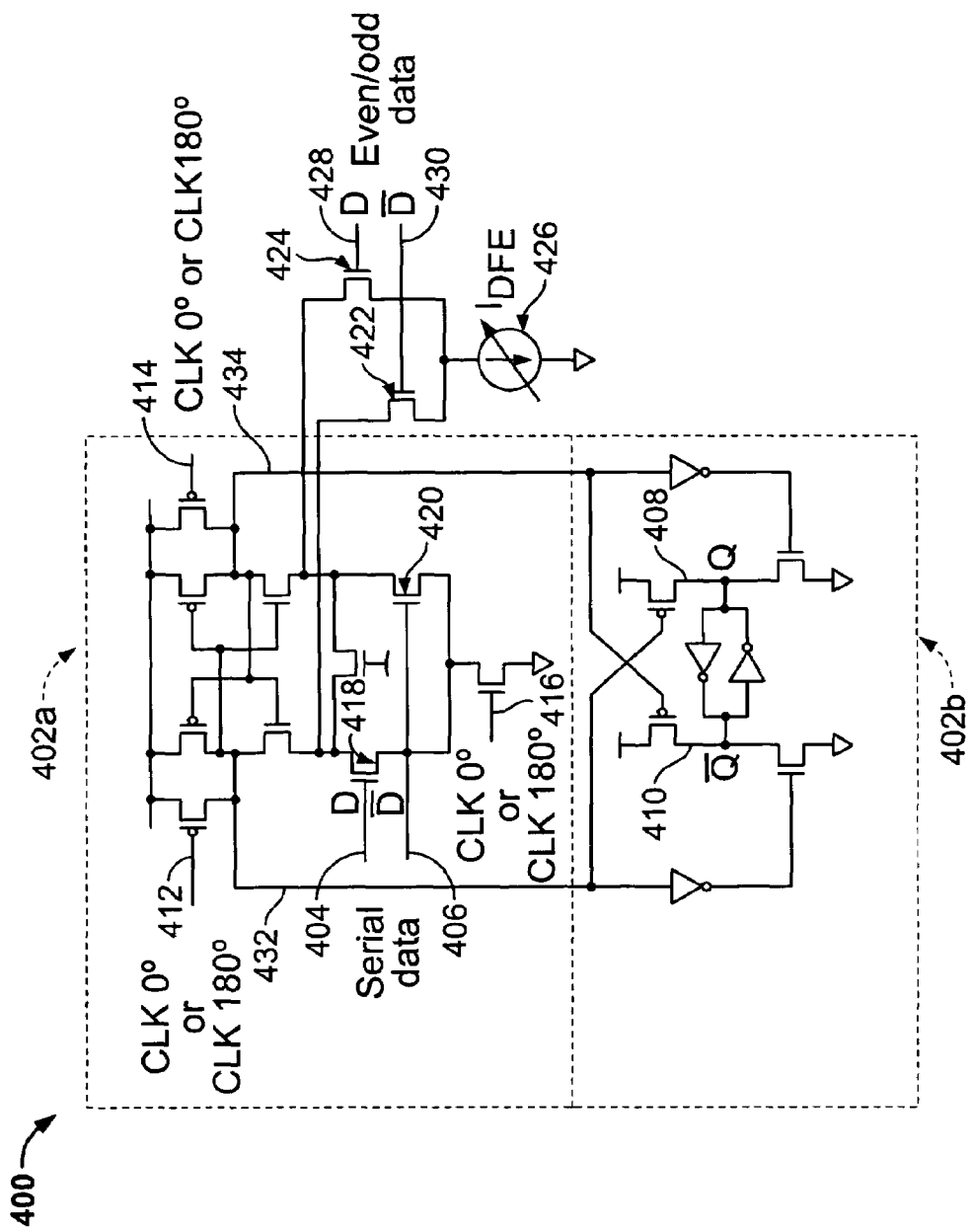
FIG. 4 is a circuit diagram of an illustrative embodiment of one branch of the DFE shown in FIG. 1 in accordance with the present invention, in which the DFE is implemented using a SAFF with an embedded summing circuit.

FIG. 4 shows illustrative DFE circuitry that includes a SAFF combined with embedded summing circuitry 400 in accordance with the present invention. It will be understood that SAFFs 206a and 206b and summing circuits 208a and 208b shown in FIG. 2 may employ the circuit implementation shown in FIG. 4. The SAFF and summing circuitry are typically two separate blocks of circuitry. In accordance with the present invention, these two types of circuitry are combined so as to effectively remove the propagation delay of the summing circuitry.

The SAFF circuit portion of circuit 400 will now be briefly described. It will generally be understood that the SAFF portion of the circuitry shown in FIG. 4 is representative of a known and typical SAFF implementation. One advantage of this particular SAFF circuit is that it demonstrates high sensitivity and restores the signal voltages to their full swing.

Specifically, the SAFF circuit shown in FIG. 4 includes sense-amplifier pulse-generating latch 402a and push-pull pulse-capturing latch 402b. Sense-amplifier pulse-generating latch 402a amplifies the differential-input data signals D and /D received on lines 404 and 406, respectively, for output to push-pull pulse-capturing latch 402b. Push-pull pulse-capturing latch 402b subsequently latches onto the amplified data signals provided by sense-amplifier pulse-generating latch 402a during a corresponding transition in the clock signal, and accordingly generates output signals Q and /Q at nodes 408 and 410, respectively. The clock signal that is provided to the SAFF circuit (at nodes 412, 414, and 416 of the sense-amplifier pulse-generating latch 402a) may be generated by clock circuitry (e.g. a ring oscillator or voltage-controlled oscillator) in the CDR circuitry. In FIG. 4, the clock input to the SAFF circuit corresponds to a half-rate clock signal CLK having either a 0° or a 180°-degree phase shift (denoted CLK 0° and CLK 180°, respectively), depending on whether the SAFF corresponds to even-data SAFF 208a or odd-data SAFF 208b of FIG. 2.

The operation of the summing circuit shown in FIG. 4 will now be described. The summing circuit is embedded within the SAFF circuit and includes NMOS transistors 418, 420, 422 and 424 and current sink 426. The inputs to the gates of NMOS transistors 418 and 420 correspond to the positive inputs of summing circuits 206a and 206b in FIG. 2. Similarly, inputs 428 and 430 to the gates of NMOS transistors 422 and 424 correspond to the output of the respective SAFF that is fed back to the negative inputs of corresponding summing circuit. For example, if the circuitry shown in FIG. 4 corresponds to even-data summing circuit 206a and SAFF 208a in FIG. 2 (i.e., the even data branch of the half-rate DFE), then inputs 428 and 430 are the outputs of odd-data SAFF 208b, and vice versa. Current sink 426 is a circuit that attempts to conduct a substantially constant current from its input to its output (ground). The amount of current that current sink 426 draws may be adjusted by the user. A greater amount of current drawn by current sink 426 increases the tap coefficient, which increases the amount of equalization that the feedback tap imparts on the SAFF circuit, and vice versa.

Now, suppose that an even-data bit corresponding to a logic 1 is transmitted following the transmission of an odd-data bit corresponding to a logic 0. Assuming that the embedded summing circuit and SAFF of FIG. 4 corresponds to the even data branch of the half-rate DFE, NMOS transistors 418 and 422 are subsequently turned on and NMOS transistors 420 and 424 are turned off. As a result, during the positive clock period, the discharging of node 432 that forces output node 408 of push-pull pulse-capturing latch 402b to assert a logic 1 is further amplified by the current—the amount of which is determined by current sink 426—that flows across NMOS transistor 422 from node 424 to ground. Meanwhile, because NMOS transistor 424 is turned off, no current is drawn from node 426. Thus, the net effect of the summing circuit is that it helps to reduce the ISI caused by the previously transmitted odd-data bit in this example by "subtracting" its effects from the transmission of the current even-data bit. Conversely, if a logic 1 even-data bit is transmitted following the transmission of a logic 1 odd-data bit, the summing circuit will pull from node 434 an additional amount of current determined by current sink 426, thereby reducing the effects of the transmission of the logic 1 odd-data bit from the response of the SAFF circuit in the even-data DFE portion to the transmission of the logic 1 even-data bit.

Although the foregoing example only describes the effect of the summing circuit in the situation where an even-data bit representing a logic 1 is transmitted, it will be understood that the situation involving the transmission of an even-data bit representing a logic 0 is similar, except that now the summing circuit pulls the current from the left leg of the SAFF (node 432) where before it pulled current from the right leg (node 434), and vice versa. Likewise, it will be understood that the description applies similarly to the odd-data portion of the half-rate DFE.

Figure 5:
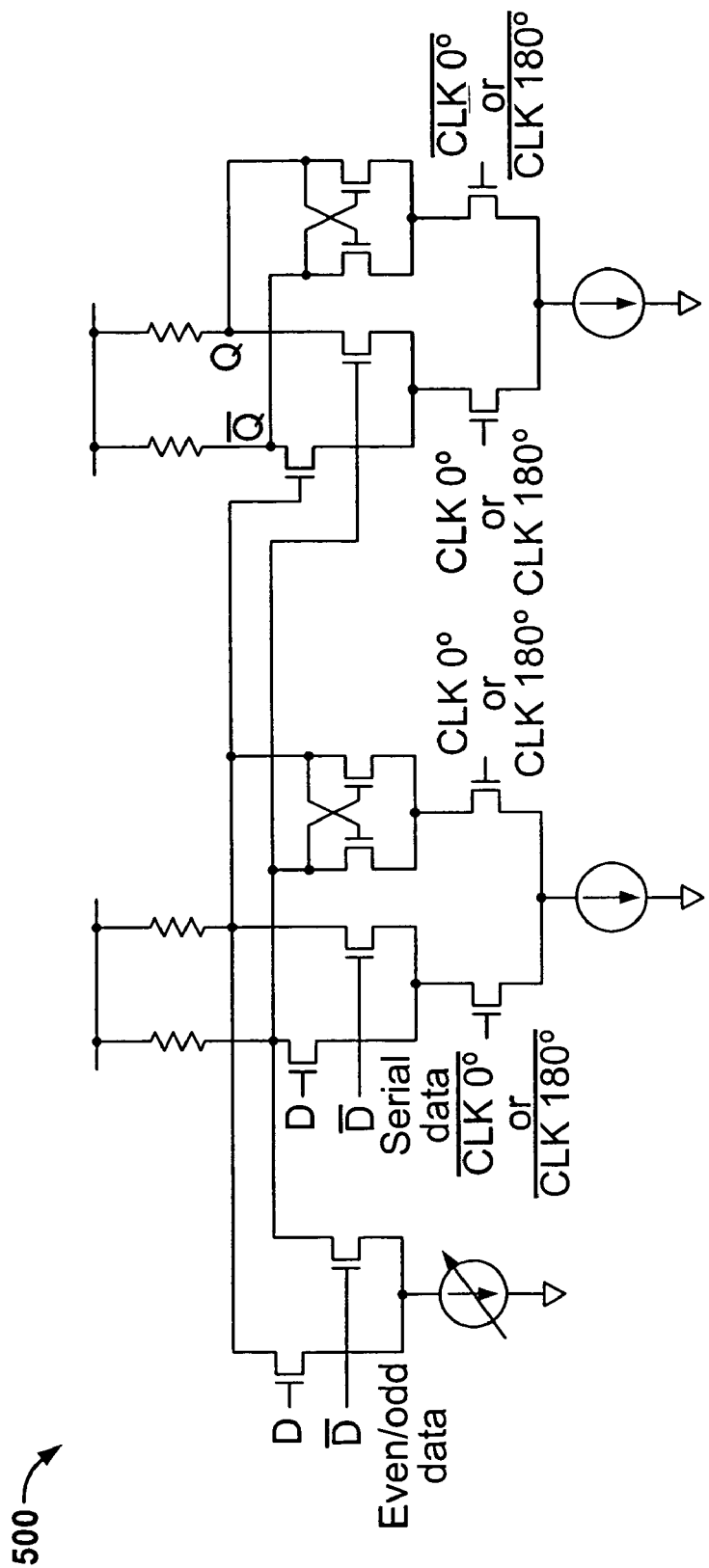
FIG. 5 is a circuit diagram of an illustrative embodiment of one branch of the DFE shown in FIG. 1 in accordance with the present invention, in which the DFE is implemented using a CML flip-flop with an embedded summing circuit.

As an alternative, the combined SAFF and summing circuit 400 of FIG. 4 may be substituted with the combined CML master-slave flip-flop and embedded summing circuit 500 shown in FIG. 5. Since the overall function of combined CML flip-flop and summing circuit 500 is the equivalent to that of combined SAFF circuit and summing circuit 400, the specific operation of circuit 500 will not be described. Nevertheless, one of ordinary skill in the art will recognize the advantages of using the CML flip-flop shown in FIG. 5 versus the CMOS flip-flop of FIG. 4. For one thing, the CML master-slave flip-flop portion of circuit 500 has smaller voltage swings than the CMOS-based SAFF shown in FIG. 4, which demonstrates rail-to-rail signal swings. As a result, the switching time of the CML flip-flop is less, thus making the CML flip-flop suitable for higher speed operation (e.g., at speeds up to 10 Gb/s). Moreover, the constant current steering of the CML master-slave flip-flop causes the switching noise exhibited by the flip-flop to be comparatively less. On the other hand, the CMOS-based SAFF of FIG. 4 consumes relatively less power since the flip-flop is powered on only during the charging and discharging periods.

Figure 6:
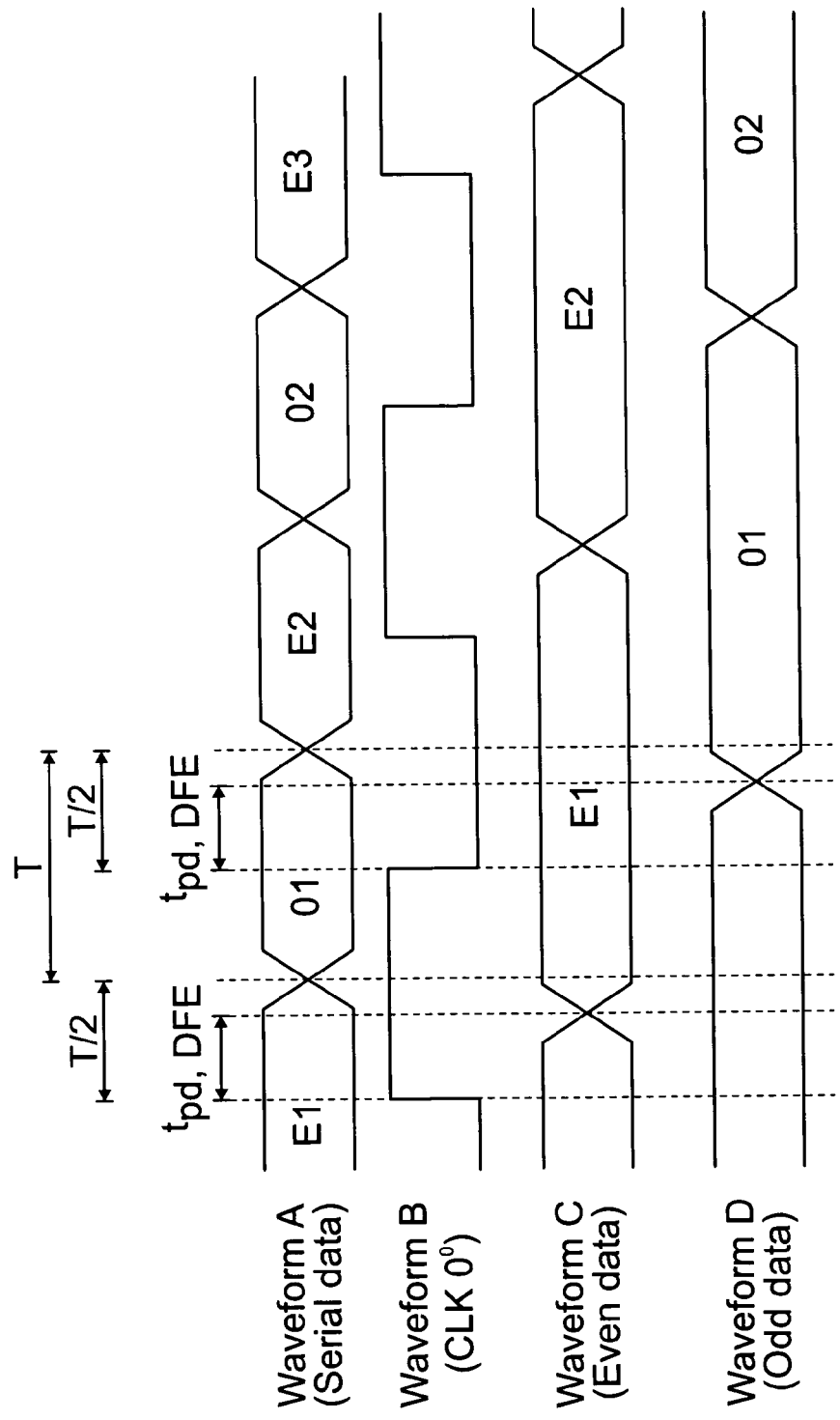
FIG. 6 is a timing diagram associated with the DFE shown in FIG. 2.

FIG. 6 shows a timing diagram illustrating the operation of the half-rate, single-tap DFE portion of the equalization circuitry of the present invention. Waveform A shows the incoming serial data bits that are received by the DFE. As indicated, each of the bits are transmitted over a period T. Waveform B shows a half-rate recovered clock signal (that may be extracted from the bits shown in waveform A). Waveform C shows the even data bits that are output by SAFF 208a in the even-data DFE branch of FIG. 2. Waveform D shows the odd data bits that are output by SAFF 208b in the odd-data DFE branch. In the embodiment shown in FIG. 2, the even data bits are sampled during the positive edge of the half-rate clock and the odd data bits are sampled during the negative edge of the half-rate clock. This may be achieved by using the clock signal represented by waveform B for the clock input to even-data SAFF 208a (i.e., CLK 0°), and by using a 180° phase-shifted version of the waveform B clock signal for the clock input to odd-data SAFF (i.e., CLK 180°); alternatively, SAFF 208a may be implemented as a positive edge-triggered flip-flop, and SAFF 208b may be implemented as a negative edge-triggered flip flop.

In order for the single-tap, half-rate DFE shown in FIG. 2 to fully cancel out the ISI effects on a currently transmitted odd bit due to a previously transmitted even bit, the previously transmitted even bit must be received by the summing circuit before the currently odd transmitted bit is received, and vice versa. For example, in order to cancel the ISI on bit O1 due to bit E1, summing circuit 206b in the odd-data DFE branch must receive bit E1 from even-data SAFF 208a before the presently transmitted O1 bit is received from analog equalizer 202. Subsequently, in order to cancel the ISI on the next transmitted bit E2 due to bit O1, summing circuit 206a in the even-data DFE branch must receive bit O1 from odd-data SAFF 208b before the present E2 bit is received from analog equalizer 202. Stated mathematically, for each branch of the half-rate DFE, the total propagation delay of the DFE branch ($t_{pd,DFE}$)—which is defined as the sum of the propagation delay of the corresponding flip-flop ($t_{cq}$) and the propagation delay of the corresponding summing circuit ($t_{sc}$)—must be less than half the bit period (i.e., the amount of time before the next bit is transmitted):

$$t_{pd,DFE}T<T/2, \text{ where } t_{pd,DFE}=t_{cq}+t_{sc}$$

Rearranging this expression in terms of the baud rate ($F_{baud}$) yields:

$$F_{baud}<1/(2*(t_{cq}+t_{sc})), \text{ where } F_{baud}=1/T$$

Thus, it can be seen that providing ISI cancellation of a previously transmitted data bit imposes a speed limitation on the operation of the DFE. By embedding the summing circuit with the flip-flop in the DFE, then, the propagation delay of the summing circuit is eliminated from the expression and the maximum allowable operating frequency is reduced to:

$$F_{baud}<1/2t_{cq}$$

As a result, embedding the summing circuit and SAFF allows the equalizer to operate at even higher speeds.

Figure 7:
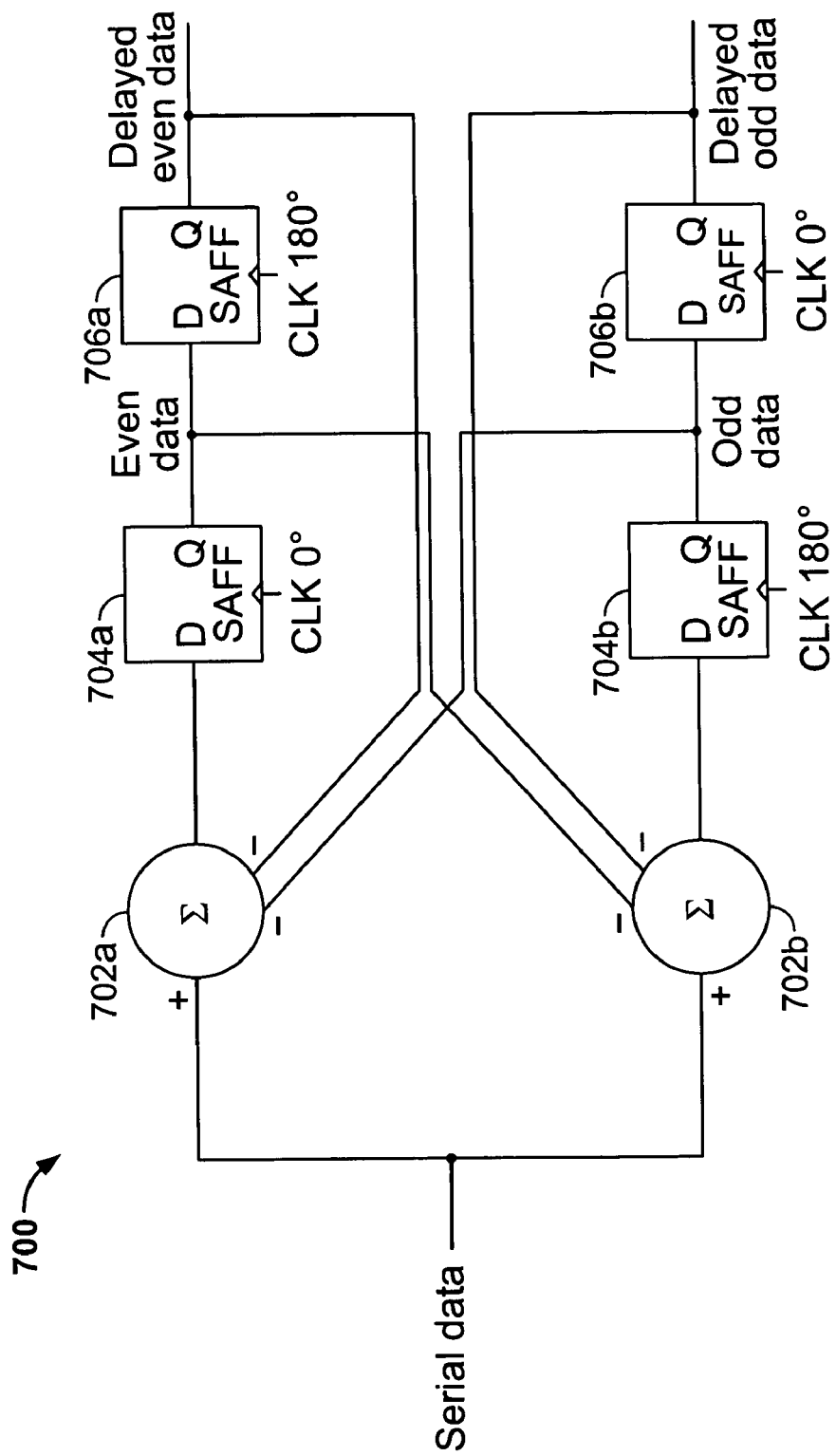
FIG. 7 is a simplified block diagram of an illustrative embodiment of a multiple-tap, half-rate DFE in accordance with the present invention.

FIG. 7 shows a simplified block diagram of a multiple-tap, half-rate DFE in accordance with the invention that may be used in place of the single-tap, half-rate DFE shown in FIG. 2. The DFE shown in FIG. 7 is configured to remove the ISI effects due to the two data bits that were immediately prior to a given bit. Although the DFE has only two feedback taps per DFE branch, it will be apparent to one of ordinary skill in the art how to implement a DFE with a greater number of feedback taps based on the figure and descriptions. The inclusion of additional feedback taps may be applicable, for example, when greater equalization capability is desired. Furthermore, as with the single-tap DFE case, it will be understood that a multiple-tap, full-rate DFE may be used instead of the multiple-tap, half-rate DFE of FIG. 7 without departing from the scope of the invention.

Since the operation of the multiple-tap DFE shown in FIG. 7 is substantially similar to the operation of the single-tap DFE shown in FIG. 2, the operation of the DFE in FIG. 7 will only be briefly described. Multiple-tap, half-rate DFE 700 includes two data paths, an even-bit data path and an odd-bit data path. The even-bit data path includes summing circuit 702a and SAFFs 704a and 706a. The odd-bit data path includes summing circuit 702b and SAFFs 704b and 706b. Incoming serial data bits are transmitted to even-data summing circuit 702a corresponding to the even-data branch of the half-rate DFE and to odd-data summing circuit 702b corresponding to the odd-data branch of the half-rate DFE. Even-data summing circuit 702a subtracts from the incoming data signal the feedback signals from delayed even-data SAFF 706a and odd-data SAFF 704b (corresponding to the two bits that were transmitted immediately prior to the currently transmitted bit). The output of summing circuit 702a is subsequently passed to even-data SAFF 704a, which amplifies and stores the bit as previously described. The clock input to even-data SAFF 704a is the half-rate recovered clock without any phase shift (CLK 0°). Also as previously discussed, even-data SAFF 704a may be implemented using the SAFF circuit shown in FIG. 4, or may be alternatively replaced with the CML master-slave flip-flop of FIG. 5 or comparable flip-flop circuitry. The output of even-data SAFF 704a is subsequently fed to both delayed even-data SAFF 706a and summing circuit 702b. Delayed even-data SAFF 706a receives clock signal CLK 180°, and therefore amplifies and outputs the signal received half a clock cycle later. The output of delayed even-data SAFF 706a is fed back to even-data summing circuit 702a as well as being output by the DFE. The odd-data bit path of the multiple-tap, half-rate DFE shown in FIG. 7 is a mirror image of the even-data bit path, and the only difference is that the clock inputs to odd-data SAFFs 704b and to delayed odd-data SAFF 706b are CLK 180° and CLK 0°, respectively (i.e., the reverse of the clock inputs to even-data SAFF 704a and delayed even-data SAFF 706a). Furthermore, in terms of specific circuit implementation, it will be apparent that even-data and odd-data SAFFs 704a and 704b of multiple-tap DFE 700 may include two embedded summing circuit branches in place of the single embedded summing circuit shown in FIGS. 4 and 5.

Figure 8:
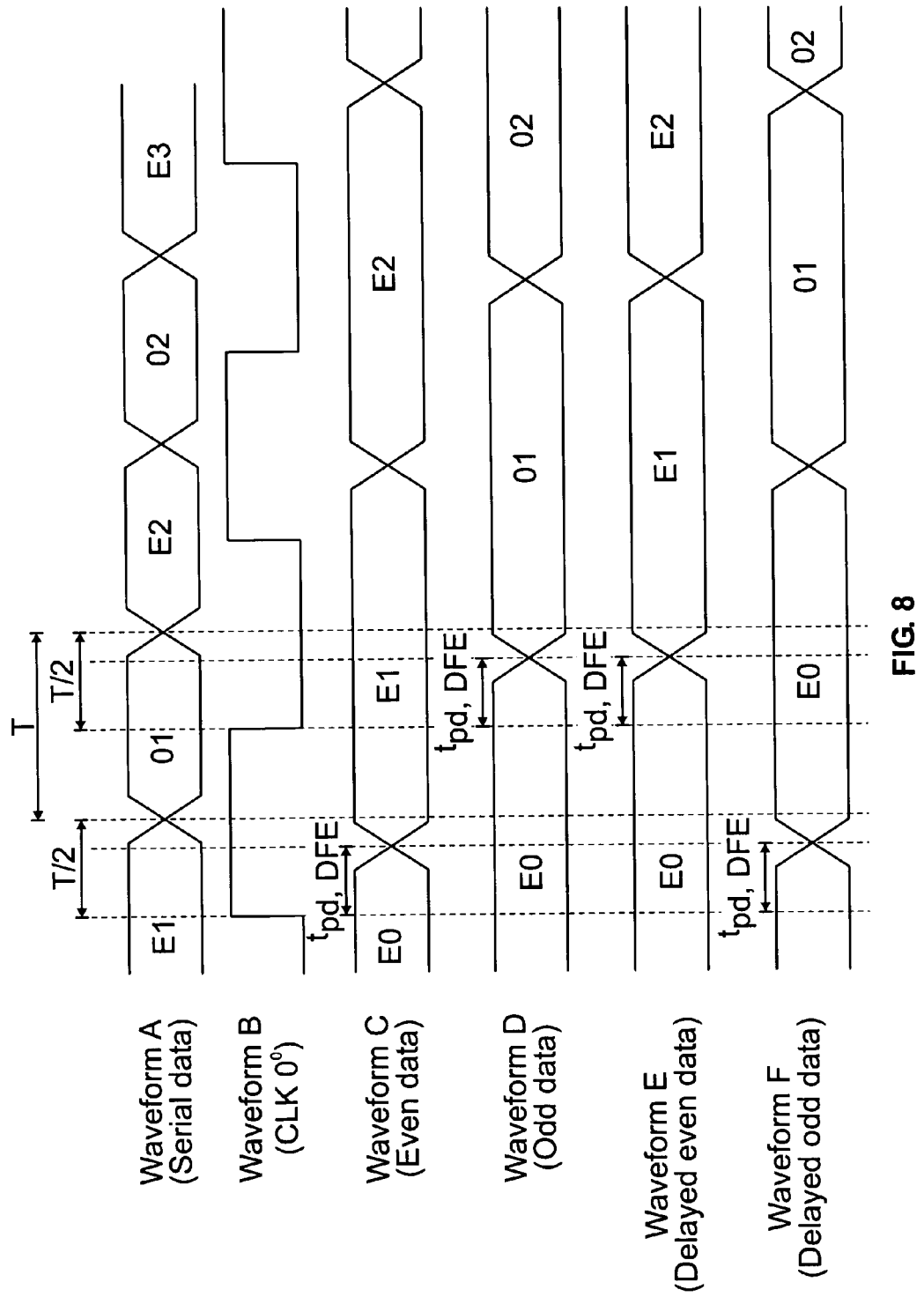
FIG. 8 is a timing diagram associated with the DFE shown in FIG. 7.

FIG. 8 shows a timing diagram that further illustrates the operation of the half-rate, multiple-tap DFE of FIG. 7. Waveforms A-D are similar to waveforms A-D shown in FIG. 6. Waveform A shows the incoming serial data bits that are transmitted to the summing circuits of FIG. 7. Waveform B shows the half-rate recovered clock signal CLK 0°. As previously mentioned, CLK 0° is fed to SAFFs 704a and 706b and CLK 180° is fed to SAFFs 704b and 706a. Waveforms C and E show the even data bits that are output by even-data SAFF 704a and by delayed even-data SAFF 706a, respectively. Waveforms D and F show the odd data bits that are output by odd-data SAFF 704b and by delayed odd-data SAFF 706b. It is important to note that similar to the case for the single-tap DFE, the summing circuit of the multiple-tap DFE must receive the previously transmitted bits that are to be subtracted from a given current bit prior to receiving the current bit in order to fully remove the ISI effects due to those previous bits. Specifically, bits E1 and O0 must be received by odd-data summing circuit 702b before bits O1 is received. Likewise, bits O1 and E1 must be received by even-data summing circuit 702a before bit E2 is received. As a result, the same timing constraint applies to the multiple-tap DFE as to the single-tap DFE; namely, the combined propagation delay of the SAFFs and a corresponding summing circuit must be less than half the half-rate recovered clock period.

Thus, by embedding the summing circuitry with the flip-flop circuitry such as that shown in FIGS. 4 and 5, the propagation delay of the summing circuit is effectively eliminated, thus increasing the maximum operable frequency of the DFE.

Although the above-described embodiments illustrate the use of a SAFF and CML flip-flop master-slave flip-flop in accordance with the DFE of the present invention, it will be understood that alternative flip-flop (or other comparable delay element circuits) designs and configurations may be used in place of any or all of the flip-flops shown in the figures without departing from the scope of the invention. In general, it will be understood that the equalization circuitry of the present invention may be implemented in various types of integrated circuits (ICs) that include but are not limited to programmable logic devices (PLDs), application-specific integrated circuits (ASICs), application-specific standard products (ASSPs), and hybrids of the foregoing examples of fully customizable and dedicated chips.

Figure 9:
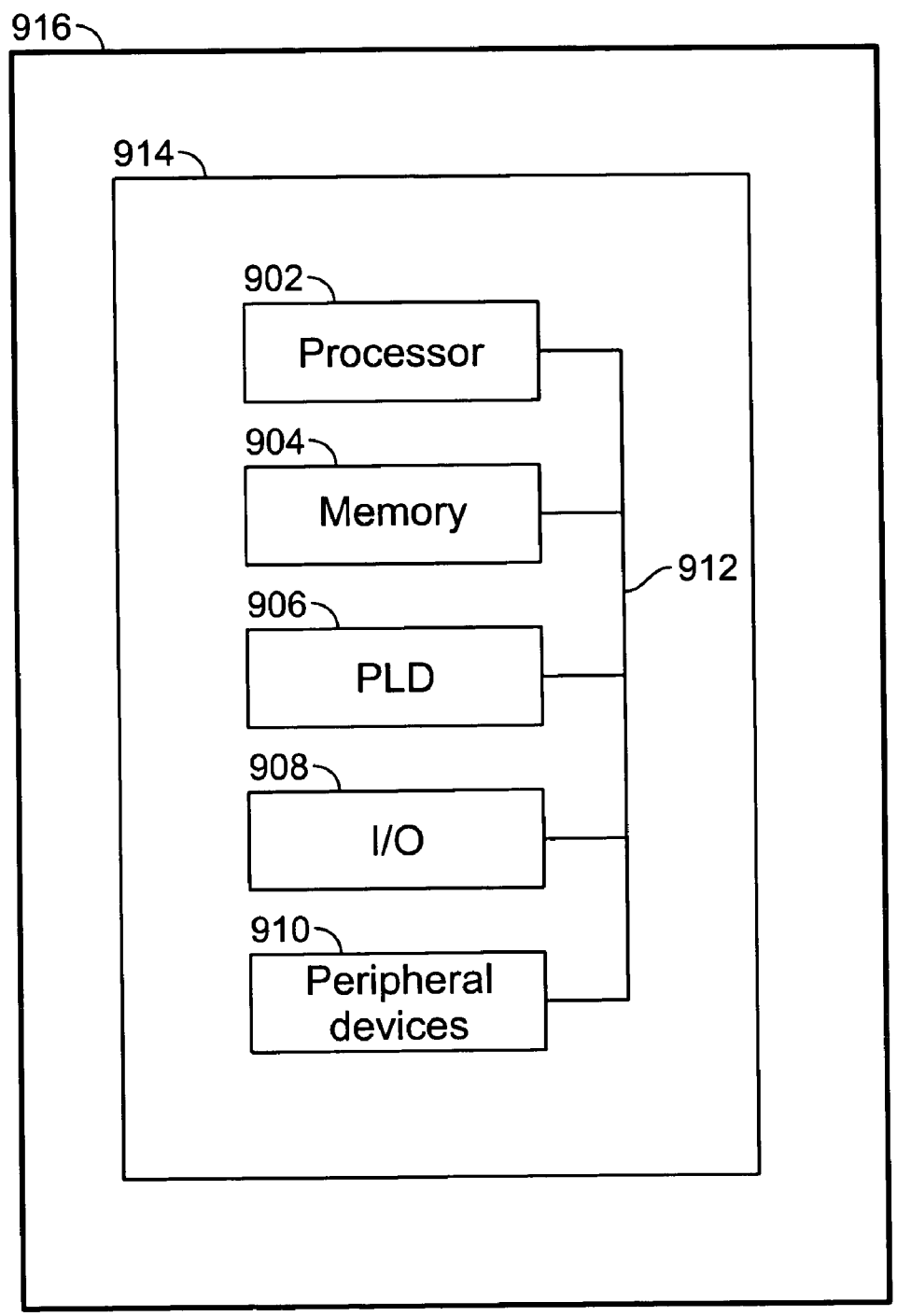
FIG. 9 is a simplified block diagram of an illustrative system employing the equalization circuitry in accordance with the present invention.

FIG. 9 illustrates an example of where the equalization circuitry of the present invention is utilized in a PLD 906 that is part of an end-user data processing system 916. Data processing system 916 may include one or more of the following components: a processor 902; memory 904; I/O circuitry 908; and peripheral devices 910. These components are coupled together by a system bus 912 and are populated on a circuit board 914 which is contained in system 916.

System 916 can be used in a wide variety of applications, such as computer networking, data networking, instrumentation, video processing, digital signal processing, or any other application where the advantage of using programmable logic is desirable. PLD 906 can be used to perform a variety of different logic functions. For example, PLD 906 can be configured as a processor or controller that works in cooperation within processor 902. In yet another example, PLD 906 can be configured as an interface between processor 902 and one of the other components in system 916.

It will be understood, therefore, that the foregoing is only illustrative of the principles of the invention, and that various modifications can be made by those skilled in the art without departing from the scope and spirit of the invention, and that the present invention is limited only by the claims that follow.

What is claimed is:

1. Equalization circuitry comprising:
  analog equalization circuitry; and
  decision feedback equalization circuitry coupled to the output of the analog equalization circuitry and comprising:
    a summing circuit operative to generate an output equal to the sum of a plurality of inputs to the summing circuit, and wherein the output of the analog equalization circuitry is coupled to one of the plurality of inputs to the summing circuit; and
    at least one feedback tap coupled to the output of the summing circuit, wherein the feedback tap comprises a flip-flop and circuitry operative to multiply an output of the flip-flop by a tap coefficient, and is operative to generate an output that is coupled to one of the remaining plurality of inputs to the summing circuit.

2. The circuitry defined in claim 1 wherein the flip-flop is shared by clock and data recovery circuitry that is separate from the equalization circuitry.

3. The circuitry defined in claim 1 wherein the feedback summing circuit is embedded with the flip-flop to form a single combined circuit.

4. The circuitry defined in claim 1 wherein the flip-flop comprises a sense-amplifier flip-flop.

5. The circuitry defined in claim 1 wherein the flip-flop comprises a current-mode logic master-slave flip-flop.

6. The circuitry defined in claim 1 wherein the tap coefficient is configurable to adjust the amount of equalization achieved by the decision feedback equalizer.

7. A digital signal processing system comprising:
processing circuitry;
a memory coupled to the processing circuitry; and
a device as defined in claim 1 coupled to the processing circuitry and the memory.

8. A printed circuit board on which is mounted a programmable logic device as defined in claim 1.

9. The printed circuit board defined in claim 8 further comprising:
a memory mounted on the printed circuit board and coupled to the memory circuitry.

10. The printed circuit board defined in claim 9 further comprising:
processing circuitry mounted on the printed circuit board and coupled to the memory circuitry.

11. Equalization circuitry comprising:
analog equalization circuitry; and
decision feedback equalization circuitry coupled to the output of the analog equalization circuitry and comprising:
a first and a second data branch, wherein the first data branch is operative to process even data bits output from the analog equalization circuitry and the second data branch is operative to process odd data bits output from the analog equalization circuitry, the first and second branches each comprising:
a summing circuit operative to generate an output equal to the sum of a plurality of inputs to the summing circuit, and wherein the output of the analog equalization circuitry is coupled to one of the plurality of inputs to the summing circuit; and
at least one feedback tap coupled to the output of the summing circuit, wherein the feedback tap comprises a flip-flop and circuitry operative to multiply an output of the flip-flop by a tap coefficient, and is operative to generate an output that is coupled to one of the remaining plurality of inputs to the summing circuit.

12. The circuitry defined in claim 11 wherein at least one flip-flop is shared by clock and data recovery circuitry that is separate from the equalization circuitry.

13. The circuitry defined in claim 11 wherein the feedback summing circuit is combined with at least one flip-flop to form a single combined circuit.

14. The circuitry defined in claim 11 wherein at least one flip-flop comprises a sense-amplifier flip-flop.

15. The circuitry defined in claim 11 wherein at least flip-flop comprises a current-mode logic master-slave flip-flop.

16. The circuitry defined in claim 11 wherein the tap coefficient is configurable to adjust the amount of equalization achieved by the decision feedback equalizer.

17. A digital signal processing system comprising:
processing circuitry;
a memory coupled to the processing circuitry; and
a device as defined in claim 11 coupled to the processing circuitry and the memory.

18. A printed circuit board on which is mounted a programmable logic device as defined in claim 11.

19. The printed circuit board defined in claim 18 further comprising:
a memory mounted on the printed circuit board and coupled to the memory circuitry.

20. The printed circuit board defined in claim 19 further comprising:
processing circuitry mounted on the printed circuit board and coupled to the memory circuitry.

21. Equalization circuitry comprising:
analog equalization circuitry; and
decision feedback equalization circuitry coupled to the output of the analog equalization circuitry and comprising:
a first and a second data branch, wherein the first data branch is operative to process even data bits output from the analog equalization circuitry and the second data branch is operative to process odd data bits output from the analog equalization circuitry, the first and second branches each comprising:
a summing circuit operative to generate an output equal to the sum of a plurality of inputs to the summing circuit, and wherein the output of the analog equalization circuitry is coupled to one of the plurality of inputs to the summing circuit; and
at least one feedback tap coupled to the output of the summing circuit, wherein the feedback tap comprises a flip-flop and circuitry operative to multiply an output of the flip-flop by a tap coefficient, and is operative to generate an output that is coupled to one of the remaining plurality of inputs to the summing circuit;
wherein the feedback summing circuit is combined with at least one flip-flop to form a single combined circuit.

22. The circuitry defined in claim 21 wherein at least one flip-flop is shared by clock and data recovery circuitry that is separate from the equalization circuitry.

23. The circuitry defined in claim 21 wherein at least one flip-flop comprises a sense-amplifier flip-flop.

24. The circuitry defined in claim 21 wherein at least one flip-flop comprises a current-mode logic master-slave flip-flop.

25. The circuitry defined in claim 21 wherein the tap coefficient is configurable to adjust the amount of equalization achieved by the decision feedback equalizer.

26. A digital signal processing system comprising:
processing circuitry;
a memory coupled to the processing circuitry; and
a device as defined in claim 21 coupled to the processing circuitry and the memory.

27. A printed circuit board on which is mounted a programmable logic device as defined in claim 21.

28. The printed circuit board defined in claim 27 further comprising:
a memory mounted on the printed circuit board and coupled to the memory circuitry.

29. The printed circuit board defined in claim 28 further comprising:
processing circuitry mounted on the printed circuit board and coupled to the memory circuitry.

* * * * *